United States Patent [19]
Otsuki et al.

[11] 3,846,488
[45] Nov. 5, 1974

[54] ACCELERATING SEPARATION RATE OF TWO LIQUID PHASES IN THE EXTRACTION OF AQUEOUS ACRYLIC ACID

[75] Inventors: Susumu Otsuki; Kyoichi Hori; Isao Miyanohara, all of Shin Nanyo, Japan

[73] Assignee: Rohm and Haas Company, Philadelphia, Pa.

[22] Filed: Jan. 6, 1972

[21] Appl. No.: 215,911

[52] U.S. Cl. ............... 260/526 N, 203/15, 203/43
[51] Int. Cl. ............................................. C07c 53/00
[58] Field of Search .................... 203/33, 43–46, 203/15; 260/526 N

[56] References Cited
UNITED STATES PATENTS

| | | | |
|---|---|---|---|
| 2,922,815 | 1/1960 | Faerber | 260/526 N |
| 3,507,840 | 4/1970 | Hurlock | 203/15 |
| 3,663,375 | 5/1972 | Witheford | 203/33 |

FOREIGN PATENTS OR APPLICATIONS

| | | | |
|---|---|---|---|
| 156,945 | 7/1962 | U.S.S.R. | 260/526 N |

*Primary Examiner*—Norman Yudkoff
*Assistant Examiner*—Hiram H. Bernstein

[57] ABSTRACT

This invention relates to the method of accelerating the separation of two layers, one being an organic solvent phase which contains an unsaturated organic acid, and the other being an aqueous phase from which the acid has been extracted. The accelerated separation of the phases is accomplished by adding an alkali metal salt or ammonium salt in minute amounts to the aqueous solution, containing acrylic acid, or methacrylic acid, and impurities such as other organic acids, before or after commingling said solution and said solvent. Other metal salts, though effective for ultimately increasing the amount of product extracted because of the "salting-out" effect, may actually delay separation of the phases. Small amounts of the useful salts do not induce polymerization as do somewhat larger amounts.

2 Claims, No Drawings

ACCELERATING SEPARATION RATE OF TWO LIQUID PHASES IN THE EXTRACTION OF AQUEOUS ACRYLIC ACID

Various unit operations have been in use to separate organic acids from aqueous solutions containing them, and in particular the method using liquid-liquid extraction is well known. This invention is concerned with such a process.

The primary factors which should be considered in connection with the extraction process are the selection of solvents and the operational conditions. Solvents and operational conditions should, of course, be chosen with a view to obtaining the greatest possible amounts of the desired components with the least amount of solvent. Another important factor, among others to be considered concerns the problem of the rate of separation of the organic liquid phase and the aqueous phase into two layers. In the extraction of aqueous solutions containing acrylic acid, difficulties under some conditions are encountered in the separation of the layers, for example, an emulsion is formed, rendering the separation practically impossible.

Various measures to deal with these difficulties which have been taken in the past include elevating the temperature, or using specially designed extractors such as exceedingly large apparatus. None of these, however, have been wholly satisfactory. While elevating the operating temperature, for instance, is effective in accelerating the rate of separation of the two liquid phases, it tends to increase the mutual solubility of the organic and water layers, which in turn upsets the equilibrium between the two liquids resulting in a drop in the yield of the extracted product. Resort to alterations in apparatus brings some degree of success, but often proves decidedly unprofitable in the face of the cost involved. In some instances, practical considerations may require altering the extracting conditions even at the expense of lowering the process efficiency.

As a result of various studies undertaken in order to solve this problem, the inventors found a method to accelerate greatly the separation rate of the two liquid phases in accordance with the present invention.

Under the present invention, the separation rate of the two liquid phases is markedly accelerated by the addition of a very small amount of alkali metal salt or ammonium salt to the solution to be treated.

Improving extraction by adding salts ("salting-out") has generally been known heretofore, the present invention differs from all the conventional methods. Thus, the objective of the conventional extraction methods in adding salts is to alter the equilibrium of the system by adding large amounts of salts (several percent to 30 percent or so), while the distinctive feature of this invention is to accelerate the separation rate of the two liquid phases by adding alkali metal salts or ammonium salts, the amount of such addition required being much less than in the conventional methods. According to the invention, the amount of alkali metal salt or ammonium salt required is 0.02-2 wt. percent or preferably in the range of 0.05-1 wt. percent of the solution (extractant-water-acid-impurities) to be treated.

This small amount not only results in efficient separation and economy, but also limits possible water pollution. Furthermore, from the fact that polymerization of acrylic acid can be accelerated by adding a large amount (e.g., 5 percent) of sodium chloride or other salts, it becomes apparent that the amount of salts used in the present invention constitutes a highly significant feature, both from the viewpoint of the diminished polymerization loss of the acrylic acid, and also from that of being freed of the need to use large amounts of polymerization inhibitors.

To further illustrate that the present invention is essentially different from the conventional methods of salting-out by adding salt, it is to be noted that when a large amount of alkaline earth metal salts such as calcium chloride is used in the extraction of acrylic acid it can increase extracting efficiency by altering equilibrium, but is not notably effective in accelerating the separation of the two liquid phases. Thus the use of this calcium salt in no way suggests the present invention. Many salts of polyvalent metals act similarly to calcium chloride. Among the useful solvents for extracting the acids are alcohols, ketones, esters, ethers, hydrocarbons, halogenated hydrocarbons, etc., such as perchloroethylene, carbon tetrachloride, benzene, petroleum ether, ethylene dichloride, toluene, ethyl acetate, ethyl acrylate, chlorobenzene, cyclohexane, and so forth. The extractive solvent must have limited solubility in water, and is preferably one which forms an azeotrope with one or more of the components in the organic layer, when the organic fraction is distilled.

While sodium and/or potassium are the preferred alkali metals, others such as lithium are useful. The salts of the inorganic acids are preferred, particularly the halides, nitrates, and sulfates, less preferred being the borates, carbonates, silicates, and phosphates.

The following examples illustrate the effectiveness of the present invention.

EXAMPLE 1

205 g. of acrylic acid, 350 g. of water and 168 g. of butyl acetate were placed in a separating funnel of 1,000 ml. capacity, and after thoroughly stirring its contents, allowed to stand for 24 hours to achieve complete separation of the two liquid layers. Then, in a series of tests, from its upper and lower layers, 25 ml. of each solution was taken and both were placed in a test tube with an inside diameter of 24 mm. and a length of 210 mm. and equipped with a ground stopper, and 0.5 wt. percent of the specified salt was added to it and dissolved. The test tube was inverted repeatedly for 10 times in order to make mixing of the solution complete, and allowed to stand. Then the time was measured for the two layers of the solution to completely separate. The temperature was 27° C. The results of the experiments are shown in Table I.

Table I

|   | Salts | Time required for the separation (in minutes) |
|---|---|---|
|   | No additives | 250 |
| The present invention | NaCl | 0.8 |
|   | NaNO$_3$ | 0.8 |
|   | Na$_2$SO$_4$ | 1.3 |
|   | KCl | 0.7 |
|   | K$_2$SO$_4$ | 0.8 |
|   | NH$_4$Cl | 0.8 |
|   | NH$_4$NO$_3$ | 0.6 |
|   | (NH$_4$)$_2$SO$_4$ | 0.8 |
|   | CaCl$_2$ | 30 |
|   | MgCl$_2$ | 250 |
|   | BaCl$_2$ | 300 |

Table I-Continued

| | Salts | Time required for the separation (in minutes) |
|---|---|---|
| Comparison | CaSO₄ (maximum solubility) | over 500 |
| | MgSO₄ | over 500 |
| | FeCl₃ | 180 |
| | ZnCl₂ | 120 |

Table I shows that whereas alkali metal salts and ammonium salts markedly accelerate the separation rate, alkaline earth metal salts and salts of other polyvalent metals fail to show much effect or even delay separation as compared to no salt at all.

EXAMPLE 2

27 g. of acrylic acid, 2 g. of acetic acid, 50 g. of water and 24 g. of butyl acetate were placed in a similar test tube as used in Example 1, and tests were carried out in a method similar to Example 1, except the amounts of salts added were changed in order to see the effects. The results are shown in Table II.

TABLE II

| | Salts | Concentration (wt. %) | Time required for the separation (in minutes) |
|---|---|---|---|
| | No additives | — | 230 |
| The present invention | NaCl | 0.016 | 68 |
| | | 0.067 | 17 |
| | | 0.136 | 1.4 |
| | | 0.589 | 1.5 |
| | | 1.131 | 1.5 |
| The present invention | NH₄Cl | 0.014 | 58 |
| | | 0.051 | 21 |
| | | 0.111 | 1.1 |
| | | 0.530 | 1.4 |
| | | 1.007 | 1.4 |
| The present invention | Na₂SO₄ | 0.084 | 48 |
| | | 0.530 | 2.1 |
| | | 1.064 | 2.2 |
| | | 2.058 | 2.3 |
| Comparison | CaCl₂ | 0.383 | over 100 |
| | MgCl₂ | 2.354 | over 100 |

EXAMPLE 3

20 g. of acrylic acid, 5 g. of acetic acid, 3 g. of formic acid, 50 g. of water and 23 g. of methylisobutyl-ketone were put into a similar test tube as used in Example 1, and experiments were carried out by a method similar to that of Example 2. The results are shown in Table III.

TABLE III

| | Salts | Concentration (wt. %) | Time required for the separation (in minutes) |
|---|---|---|---|
| | No additives | — | over 150 |
| The present invention | NaCl | 0.017 | 32 |
| | | 0.065 | 4.5 |

TABLE III-Continued

| | Salts | Concentration (wt. %) | Time required for the separation (in minutes) |
|---|---|---|---|
| present invention | | 0.116 | 1.1 |
| | | 0.551 | 1.2 |
| | | 1.061 | 1.2 |
| The present invention | NH₄Cl | 0.014 | 100 |
| | | 0.110 | 3.8 |
| | | 0.501 | 1.0 |
| | | 0.998 | 1.1 |
| The present invention | Na₂SO₄ | 0.025 | 29 |
| | | 0.068 | 11 |
| | | 0.116 | 3.4 |
| | | 0.516 | 1.8 |
| | | 1.044 | 1.9 |
| Comparison | CaCl₂ | 0.015 | over 100 |
| | MgCl₂ | 2.021 | over 100 |

EXAMPLE 4

30 g. of acrylic acid, 2 g. of acetic acid, 42 g. of water and 20 g. of isopropyl ether were put into a similar test tube as used in Example 1, and experiments were carried out in a similar manner to Example 2. The results are shown in Table IV.

TABLE IV

| | Salts | Concentration (wt. %) | Time required for the separation (in minutes) |
|---|---|---|---|
| | No additives | — | 50 |
| The present invention | NaCl | 0.013 | 23 |
| | | 0.071 | 14 |
| | | 0.143 | 8 |
| | | 0.430 | 1.8 |
| | | 0.891 | 1.9 |
| The present invention | NH₄Cl | 0.028 | 13 |
| | | 0.073 | 6 |
| | 0.132 | 1.4 | |
| | | 0.519 | 1.7 |
| | | 1.151 | 1.7 |
| The present invention | Na₂SO₄ | 0.049 | 35 |
| | | 0.214 | 23 |
| | | 0.697 | 2.8 |
| | | 1.315 | 2.8 |
| Comparison | CaCl₂ | 0.600 | 40 |
| | MgCl₂ | 1.322 | 50 |

What is claimed is:

1. A method of accelerating the separation rate of an organic solvent phase and an aqueous phase in the organic solvent extraction of an aqueous solution of acrylic acid or methacrylic acid which comprises adding an alkali metal salt or ammonium salt to the aqueous solution containing the acid, the amount of salt being from 0.05 to 1 percent by weight of the combined weights of the solvent, acid, water, and any additional solutes therein, and separating the phases.

2. The method of claim 1 in which said salt is the sulfate, nitrate or chloride of sodium, potassium or ammonia.

* * * * *